(12) United States Patent
Bezemer et al.

(10) Patent No.: US 8,729,140 B2
(45) Date of Patent: May 20, 2014

(54) PROCESS FOR REGENERATING A CATALYST

(75) Inventors: Gerrit Leendert Bezemer, Amsterdam (NL); Stephen Nkrumah, Amsterdam (NL); Johannes Theodorus Maria Smits, Amsterdam (NL)

(73) Assignee: Shell Oil Company, Houston, TX (US)

( * ) Notice: Subject to any disclaimer, the term of this patent is extended or adjusted under 35 U.S.C. 154(b) by 330 days.

(21) Appl. No.: 13/333,409

(22) Filed: Dec. 21, 2011

(65) Prior Publication Data

US 2012/0165417 A1    Jun. 28, 2012

(30) Foreign Application Priority Data

Dec. 23, 2010 (EP) .................................... 10196901

(51) Int. Cl.
  *C07C 27/00*  (2006.01)
  *B01J 20/34*  (2006.01)

(52) U.S. Cl.
  USPC ................. 518/700; 502/20; 502/22; 502/26; 502/38

(58) Field of Classification Search
  USPC .......................... 518/700; 502/20, 22, 26, 38
  See application file for complete search history.

(56) References Cited

U.S. PATENT DOCUMENTS

| 4,595,703 A | 6/1986 | Payne et al. .................... 518/715 |
| 2003/0144128 A1 | 7/2003 | Daage et al. ..................... 502/23 |
| 2003/0144129 A1 | 7/2003 | Clark et al. ..................... 502/28 |

FOREIGN PATENT DOCUMENTS

| WO | WO9700231 | 1/1997 | ................ C07C 1/00 |
| WO | WO03064356 | 8/2003 | ............... C07C 27/00 |
| WO | WO2010069978 | 6/2010 | ............... B01J 23/00 |
| WO | WO2011080073 | 7/2011 | ............... B01J 23/75 |

*Primary Examiner* — Jafar Parsa

(57) ABSTRACT

A process for regenerating one or more deactivated cobalt comprising Fischer-Tropsch catalyst particle(s), comprising the steps of: (i) oxidizing the catalyst particle(s) at a temperature between 20 and 400° C.; (ii) treating the catalyst particle(s) for more than 5 minutes, (iii) drying the catalyst particle(s); and (iv) optionally reducing the catalyst particle(s) with hydrogen or a hydrogen comprising gas. This process may be preceded by a step in which Fischer-Tropsch product is removed from the catalyst particle(s). The treatment is performed using carbon dioxide and a liquid comprising ammonia.

17 Claims, No Drawings

PROCESS FOR REGENERATING A CATALYST

This application claims the benefit of European Application No. 10196901.2, filed Dec. 23, 2010, which is incorporated herein by reference.

BACKGROUND

The present invention relates to a process for regenerating a catalyst. The invention especially relates to a process for regenerating a catalyst in situ in a reactor tube. Furthermore, the invention relates to a process for ex situ regeneration of a catalyst. The catalyst is suitable for use in producing normally gaseous, normally liquid and optionally normally solid hydrocarbons from synthesis gas generally provided from a hydrocarbonaceous feed, for example a Fischer-Tropsch process. The invention further relates to the regenerated catalyst and the use thereof in Fischer-Tropsch processes.

The Fischer-Tropsch process can be used for the conversion of synthesis gas (from hydrocarbonaceous feed stocks) into liquid and/or solid hydrocarbons. Generally, the feed stock (e.g. natural gas, associated gas and/or coal-bed methane, heavy and/or residual oil fractions, coal, biomass) is converted in a first step into a mixture of hydrogen and carbon monoxide (this mixture is often referred to as synthesis gas or syngas). The synthesis gas is then fed into a reactor where it is converted in one or more steps over a suitable catalyst at elevated temperature and pressure into paraffinic compounds and water. The obtained paraffinic compounds range from methane to high molecular weight hydrocarbons. The obtained high molecular weight hydrocarbons can comprise up to 200 carbon atoms, or, under particular circumstances, even more carbon atoms.

Numerous types of reactor systems have been developed for carrying out the Fischer-Tropsch reaction. For example, Fischer-Tropsch reactor systems include fixed bed reactors, especially multi-tubular fixed bed reactors, fluidised bed reactors, such as entrained fluidised bed reactors and fixed fluidised bed reactors, and slurry bed reactors such as three-phase slurry bubble columns and ebulated bed reactors.

Catalysts used in the Fischer-Tropsch synthesis often comprise a carrier based support material and one or more metals from Group 8-10 of the Periodic Table, especially from the cobalt or iron groups, optionally in combination with one or more metal oxides and/or metals as promoters selected from zirconium, titanium, chromium, vanadium and manganese, especially manganese. Such catalysts are known in the art and have been described for example, in the specifications of WO 9700231A and U.S. Pat. No. 4,595,703.

One of the limitations of a Fischer-Tropsch process is that the activity of the catalyst will, due to a number of factors, decrease over time. A catalyst that shows a decreased activity after use in a Fischer-Tropsch process is sometimes referred to as deactivated catalyst, even though it usually still shows activity. Sometimes such a catalyst is referred to as a deteriorated catalyst. Sometimes it is possible to regenerate the catalyst. This may be performed, for example, with one or more oxidation and/or reduction steps.

It is one object of the present invention to provide an in situ process for regenerating a Fischer-Tropsch catalyst comprising cobalt in a reactor tube.

It is another object of the present invention to provide an ex situ process for regenerating a Fischer-Tropsch catalyst comprising cobalt. In the ex situ process the catalyst is subjected to an ex situ treatment step. The deactivated catalyst particle(s) is/are subjected to a treatment step after being unloaded from the reactor in which the catalyst particle(s) were deactivated by use in a Fischer-Tropsch process.

Highly suitable in situ and ex situ regeneration processes for cobalt comprising catalysts are described in WO2010069978 and in PCT/EP2010/069717.

The present invention especially relates to processes in which the loss of cobalt is further minimized as compared to the processes described in WO2010069978 and PCT/EP2010/069717.

SUMMARY OF THE INVENTION

The present invention is not limited to but especially relates to a process that can be used to regenerate fixed bed catalysts, such as pellets and extrudates larger than 1 mm, in situ in one or more tubes in a fixed bed Fischer Tropsch reactor. The present invention further especially relates to a process that can be used to regenerate an immobilised slurry catalyst in a reactor tube, preferably an immobilised slurry catalyst comprising one or more catalyst particles larger than 1 mm. Particles having a particle size of at least 1 mm are defined as particles having a longest internal straight length of at least 1 mm.

According to one aspect of the present invention, there is provided a process for regenerating one or more cobalt comprising Fischer-Tropsch catalyst particles in situ in a reactor tube, said catalyst particle(s) having been deactivated by use in a Fischer-Tropsch process, said process for regenerating comprising the steps of:

(i) oxidising the catalyst particle(s) at a temperature between 20 and 400° C., preferably between 100 and 400° C., more preferably between 200 and 400° C.;

(ii) treating the catalyst particle(s) for more than 5 minutes;

(iii) drying and optionally heating the catalyst particle(s); and (iv) optionally reducing the catalyst particle(s) with hydrogen or a hydrogen comprising gas;

wherein the treatment step (ii) comprises the steps of:

(ii)a filling pores of the catalyst particle(s) with a liquid comprising ammonia, preferably a liquid comprising water and ammonia, and having a pH in the range of from 10 to 14, at a temperature in the range of from 0 to 50° C., using a pore fill method;

(ii)b passing carbon dioxide through the reactor tube along the catalyst particle(s);

(ii)c leaving the carbon dioxide treated liquid in the pores for more than 5 minutes at a temperature between 5 and 90° C., preferably at a temperature between 40 and 70° C., more preferably at a temperature between 50 and 60° C.

This process will be referred to as the "in situ process" in this document.

With a pore fill method is meant a process in which most of the pores of the carrier material at the surface of one or more catalyst particles are filled with the liquid. Optionally excess liquid is removed. And, the particle(s) is/are not immersed in the liquid, or the particle(s) is/are not immersed in the liquid after removal of excess liquid. Hence, at the end of the pore fill method, the pores of the carrier material at the surface of one or more catalyst particles are filled with the liquid, whereas the catalyst particle(s) is/are not immersed in the liquid.

In the in situ process, pore fill may be achieved by filling a reactor tube comprising the catalyst particle(s) to a certain level with the liquid, and in a next step removing the excess liquid. The excess liquid may, for example, be removed by letting it out at the bottom of the reactor tube. Preferably, a gas, most preferably an inert gas such as nitrogen, is let in the reactor tube to enhance the removal of the excess liquid. Liquid is still present in pores of the catalyst particles after removal of the excess liquid.

All steps of the process of this aspect of the invention are performed in the order of numbering. The process may comprise additional steps. All steps of this aspect of the process of the invention are performed in situ in a reactor tube. Preferably, the catalyst particle(s) has/have been deactivated by use in a Fischer-Tropsch process in a reactor tube, and all steps of this aspect of the process of the invention are performed in situ in the same reactor tube. This is advantageous, as it makes unloading and reloading of the deactivated catalyst redundant. from 0 to 50° C., using a pore fill method;

In step (ii)b, carbon dioxide is passed through the reactor tube along the catalyst particle(s). Ammonia, which is in the liquid in the pores, and carbon dioxide convert into ammonium carbonate and/or ammonium bicarbonate. After step (ii)b, pores in the catalyst particle(s) thus comprise a liquid comprising ammonium carbonate and/or ammonium bicarbonate. In step (ii)c, the carbon dioxide treated liquid is left in the pores for more than 5 minutes. Hence, in step (ii)c a liquid comprising ammonium carbonate and/or ammonium bicarbonate is left in the pores for more than 5 minutes.

According to another aspect of the present invention, the deactivated catalyst particle(s) is/are subjected to a treatment step after being unloaded from the reactor in which the catalyst particle(s) were deactivated by use in a Fischer-Tropsch process. The catalyst particle(s) is/are thus subjected to an ex situ treatment step.

Hence, there is provided a process for regenerating one or more cobalt comprising Fischer-Tropsch catalyst particles, said catalyst particle(s) having been deactivated by use in a Fischer-Tropsch process in a reactor tube, said process for regenerating comprising the steps of:

(a) oxidising the catalyst particle(s) in the reactor tube at a temperature between 20 and 400° C., preferably between 100 and 400° C., more preferably between 200 and 400° C.;

(b) unloading the catalyst particle(s) from the reactor tube;

(c) treating catalyst particle(s) for more than 5 minutes;

(d) drying and optionally heating the catalyst particle(s);

wherein the treatment step (c) comprises the steps of:

(c)I filling pores of the catalyst particle(s) with a liquid comprising ammonia, preferably a liquid comprising water and ammonia, and having a pH in the range of from 10 to 14, at a temperature in the range of from 0 to 50° C., using a pore fill method;

(c)II passing carbon dioxide along the catalyst particle(s);

(c)III leaving the carbon dioxide treated liquid in the pores for more than 5 minutes at a temperature between 5 and 90° C., preferably at a temperature between 40 and 70° C., more preferably at a temperature between 50 and 60° C.

This process will be referred to as the "ex situ process" in this document.

As mentioned above, with a pore fill method is meant a process in which most of the pores of the carrier material at the surface of one or more catalyst particles are filled with the liquid. Optionally excess liquid is removed. And, the particle (s) is/are not immersed in the liquid, or the particle(s) is/are not immersed in the liquid after removal of excess liquid. Hence, at the end of the pore fill method, the pores of the carrier material at the surface of one or more catalyst particles are filled with the liquid, whereas the catalyst particle(s) is/are not immersed in the liquid.

In the ex situ process, pore fill may be achieved by, for example, filling a container comprising the catalyst particle (s) to a certain level with the liquid, and in a next step removing the excess liquid. Additionally or alternatively, pore fill may be obtained in the ex situ process by impregnating the catalyst particle(s) with the liquid using an incipient wetness technique, for example by adding just enough liquid to fill the pores.

With the in situ and ex situ processes according to the present invention, the activity of a deactivated cobalt comprising Fischer-Tropsch catalyst can be increased significantly.

In step (c)II, carbon dioxide is passed along the catalyst particle(s). Ammonia, which is in the liquid in the pores, and carbon dioxide convert into ammonium carbonate and/or ammonium bicarbonate. In step (c)III, the carbon dioxide treated liquid is left in the pores for more than 5 minutes. Hence, in step (c)III a liquid comprising ammonium carbonate and/or ammonium bicarbonate is left in the pores for more than 5 minutes.

DETAILED DESCRIPTION

With the processes of the present invention the loss of cobalt is further minimized as compared to the processes described in WO2010069978 and PCT/EP2010/069717. It was found that filling pores of cobalt comprising catalyst particle(s) using a pore fill method hardly results in cobalt loss when the pores are filled with a liquid comprising ammonia, preferably a liquid comprising water and ammonia, and having a pH in the range of from 10 to 14, at a temperature in the range of from 0 to 50° C. The cobalt in the catalyst particle(s) does not dissolve or hardly dissolves in the liquid comprising ammonia and is thus not or hardly drained away when excess liquid is removed when applying the pore fill method. Less than 0.01 wt % cobalt is drained away, calculated on the total weight of cobalt in the catalyst particle(s) that is subjected to the pore fill method. After the treatment step (ii) or (c), the catalyst particle(s) is/are dried in step (iii) or (d). During this drying step liquid evaporates while cobalt precipitates on the catalyst particle(s), especially in pores of the catalyst particle (s). With the processes of the invention it is thus possible to minimize the loss of cobalt when regenerating a cobalt comprising Fischer Tropsch catalyst, while at the same time the operating temperature for the pore fill method in the treatment step is not critical.

The processes of the current invention are suitable for fixed bed catalysts, slurry catalysts, i.e. powder like catalysts, and immobilised slurry catalyst, for example wire structures coated with catalyst material. The processes of the current invention are especially suitable for fixed bed catalysts and immobilised slurry catalysts.

Examples of suitable fixed bed catalysts are pellets and extrudates larger than 1 mm, which comprise cobalt and a refractory metal oxide as carrier material.

Examples of suitable immobilised slurry catalysts to which the process of the present invention can be applied are catalysts with a size larger than 1 mm which catalysts comprise a substrate and catalyst material.

The immobilised slurry catalyst may, for example, be in the form of a fixed structure (or arranged packing) such as gauze, corrugated sheet material that may or may not be perforated with holes, woven or non-woven structure, honeycomb, foam, sponge, mesh, webbing, foil construct, woven mat form, wire, ball, cylinder, cube, sphere, ovoid, monolith, or any combination of these.

The substrate acts as a support for the catalyst material that is located thereon. The substrate preferably comprises an inert material capable of withstanding conditions within the reactor. The substrate may, for example, comprise a refractory metal oxide and/or metal. Preferably the substrate comprises a metal, such as stainless steel, iron, or copper.

The catalyst material comprises a carrier and a catalytically active metal. Suitable carriers are refractory metal oxides, such as alumina, silica and titania, preferably titania. In the present invention, the catalytically active metal, or one of the catalytically active metals, is cobalt.

In case the catalyst material comprises titania as carrier for the cobalt, preferably the amount of metallic cobalt is in the range of 10 to 35 weight % (wt %) of cobalt, more preferably in the range of 15 to 30 wt % cobalt, calculated on the total weight of titania and metallic cobalt.

The catalyst to be regenerated comprises cobalt and has been deactivated by use in a Fischer-Tropsch process. The activity of the deactivated catalyst preferably is at least 10% lower as compared to its initial activity when it was freshly prepared. The catalyst may be fully deactivated, i.e. having lost more than 90% of its initial activity. For some cases it may be advantageous to regenerate a catalyst when its activity has been reduced with at least 50%, more preferably at least 60%. For some cases it may be advantageous to regenerate a catalyst when its activity has been reduced with at most 90%, preferably at most 85%, more preferably at most 80%.

The catalyst preferably comprises cobalt and a carrier material for the cobalt. The carrier material preferably comprises a refractory metal oxide, such as alumina, silica, titania, and mixtures thereof, more preferably titania.

In one embodiment of the process according to the invention, the catalyst particle may be reduced with hydrogen or a hydrogen comprising gas after the oxidation step (i) or (a) and before the treatment step (ii) or (c). Such a reduction may result in a partially or fully reduced catalyst particle. During such reduction after step (i) or (a), some of the cobalt in the catalyst particle that is present as cobalt(II,III)oxide ($Co_3O_4$) is converted to cobalt(II)oxide (CoO) and/or to metallic cobalt (Co).

The liquid used in step (ii)a of the in situ process or in step (c)I of the ex situ process comprises ammonia. Preferably the liquid comprises water and ammonia. The pH of the liquid is in the range of from 10 to 14, preferably 11 to 14, even more preferably 11.5 to 14. The temperature of the liquid is in the range of from 0 to 50° C.

The liquid used in step (ii)a of the in situ process or in step (c)I of the ex situ process may additionally comprise one or more amines, for example methylamine, ethylamine, propylamine, butylamine and/or ethylene diamine, and preferably methylamine and/or ethylene diamine.

In step (ii)b of the in situ process or in step (c)II of the ex situ process carbon dioxide is passed along the catalyst particle(s). This may be performed by passing gaseous carbon dioxide or a gas comprising carbon dioxide along the gaseous particle(s). A gas comprising carbon dioxide may further comprise inert gasses, for example nitrogen, argon, or methane. Preferably a gas comprising carbon dioxide does not comprise more than 5 vol % oxygen, more preferably not more than 1 vol % oxygen, even more preferably not more than 0.1 vol % oxygen, most preferably no oxygen. The carbon dioxide or the gas comprising carbon dioxide may be at a temperature in the range of from 0 to 50° C.

In one embodiment in addition to carbon dioxide, one or more amines, for example methylamine, ethylamine, propylamine, butylamine and/or ethylene diamine and/or extra ammonia, is/are supplied to the catalyst particle(s) of which pores are filled with the liquid comprising ammonia.

The amount of carbon dioxide which is passed along the particle(s) in step (ii) b or (c)II preferably is enough to convert at least 25 wt % of the ammonia in the liquid present on and in the pores of the catalyst particle(s). The amount of carbon dioxide may be regulated by adjusting the gas hourly space velocity of the carbon dioxyde or of the gas comprising carbon dioxide. Additionally or alternatively, in case a gas is used comprising carbon dioxide, the concentration of carbon dioxide in the gas may be adjusted. Additionally or alternatively, carbon dioxide is supplied to the reactor tube or container comprising the catalyst particle(s) of which pores are filled with the liquid comprising ammonia, after which the carbon dioxide is kept in the reactor tube or container for at least 1 minute.

Ammonia in the liquid, whereby the liquid preferably comprises ammonia and water, converts into ammonium carbonate and/or ammonium bicarbonate in step (ii)b or (c)II. In case the carbon dioxide is contacted with a liquid comprising water and ammonia, the following equilibrium reactions may take place:

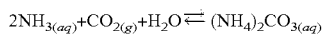

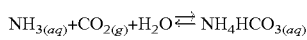

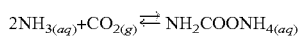

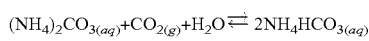

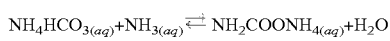

$NH_3(aq)$ can also be represented by $NH_4^+(aq)+OH^-(aq)$.

Preferably at least 10 weight %, more preferably more than 20 wt %, of the cobalt in the catalyst particle that is treated in step (ii) or (c) is present as $Co_3O_4$. Preferably at most 99 weight %, more preferably less than 95 wt %, of the cobalt in the catalyst particle that is treated in step (ii) or (c) is present as $Co_3O_4$. Preferably less than 50 wt %, more preferably at most 40 wt % of the cobalt in the catalyst particle is cobalt (II), for example present as divalent oxide or divalent hydroxide.

Such a catalyst particle can normally be obtained when a Fischer-Tropsch catalyst particle which has been deactivated by use in a Fischer-Tropsch process is oxidized in step (i) or (a) by treating the catalyst particle with an oxygen-containing gas at a temperature between 20 and 600° C., preferably between 100 and 450° C., more preferably between 200 and 450° C., for about 12 hours. The oxygen containing gas may, for example, be pure oxygen, oxygen enriched air (preferably containing 25 to 70 volume % oxygen), air (containing about 21 volume % oxygen), or air diluted with inert e.g. with N2. Preferably the oxygen containing gas comprises 0.1 to 10 vol % O2, more preferably 0.3 to 5 vol % O2. In one embodiment, the catalyst particle is subjected to a reduction step after the oxidation step (i) or (a) and before the treatment step (ii) or (c).

While not wishing to be bound by any theory, it is believed that the solvent used in step (ii) dissolves a part of any Co, any CoO, and a small part of the Co3O4 present in the catalyst particle.

Step (ii)c or (c)III is performed at a temperature between 5 and 90° C., preferably at a temperature between 40 and 70° C., more preferably at a temperature between 50 and 60° C. In some applications it may be beneficial to increase the temperature during this step. The duration of step (ii)c or (c)III may be adjusted to the temperature at which it takes place. When step (ii)c or (c)III is performed at a relatively low temperature, for example between 35 and 40° C., the treatment may be performed for several days up to weeks. When step (ii)c or (c)III is performed at a temperature between 50 and 60° C., the treatment may need only about 4 hours. When step (ii)c or (c)III is performed at a relatively high temperature, for example between 70 and 80° C., the solvent may start to evaporate, which is less preferred.

In one embodiment of the present invention, the oxidation step (i), the treating step (ii), the drying step (iii), and a reduction step (iv) are performed in situ in the Fischer-Tropsch reactor tube. In a preferred embodiment the whole catalyst particle or all catalyst particles in the reactor tube is/are subjected to the oxidation step (i) and the reduction step (iv).

The whole catalyst particle or all catalyst particles in the reactor tube may be subjected to the treating step (ii). Alternatively, a part of the catalyst particle(s) may be subjected to the treating step (ii).

Preferably all catalyst particles in the reactor tube are subjected to the treating step (ii) in case the reactor tube comprises a slurry catalyst of which at least 90% of the particles is smaller than 1 mm, preferably smaller than 0.5 mm. This is especially preferred in case the reactor tube comprises a slurry catalyst of which 100% of the particles is smaller than 1 mm, preferably smaller than 0.5 mm.

In case the reactor tube comprises one or more fixed bed catalyst particles or one or more immobilised slurry catalyst particles, preferably a part of the catalyst particle(s) in the reactor tube is subjected to the treating step (ii). This is especially preferred when the particle or at least 30% of the particles is larger than 1 mm. Preferably 90% or less of the fixed bed or immobilised slurry catalyst particle(s) is subjected to the treating step (ii), more preferably 85% or less, even more preferably 80% or less, still more preferably 65% or less, most preferably 55% or less. Preferably 20% or more of the fixed bed or immobilised slurry catalyst particle(s) is subjected to the treating step (ii), more preferably 35% or more, even more preferably 45% or more.

In case the reactor tube comprises one or more fixed bed catalyst particles or one or more immobilised slurry catalyst particles, and a part of the catalyst particle(s) is subjected to the treating step (ii) in situ in the tube, the part of the catalyst particle(s) in the reactor tube that is subjected to the treating step (ii) preferably is located at the downstream end. Upstream and downstream are defined herein with respect to the flow of the syngas, i.e. the flow of the mixture of hydrogen and carbon monoxide, in a Fischer Tropsch reactor. Reference herein to the upstream end of the catalyst particle(s) is thus to the end of the catalyst particle(s) to which the syngas is supplied during Fischer Tropsch reaction. Reference herein to the downstream end of the catalyst particle(s) is to the other end.

In a preferred embodiment, 85% or less of the catalyst particle(s) is treated, preferably 65% or less, more preferably 55% or less, whereby the part of the catalyst particle(s) located at the upstream end is not or hardly subjected to the treating step (ii). Additionally, or alternatively, it is preferred that at least 20%, preferably at least 35%, even more preferably at least 45% of the catalyst particle(s) is treated, whereby the part of the catalyst particle(s) located at the downstream end is subjected to the treating step (ii). In a highly preferred embodiment, 35% to 85%, more preferably 45% to 65%, of the catalyst particle(s) is treated whereby the part of the catalyst particles located at the upstream end is not or hardly subjected to the treating step (ii) and the part of the catalyst particle(s) located at the downstream end is subjected to the treating step (ii).

In case the reactor tube comprises one or more fixed bed catalyst particles or one or more immobilised slurry catalyst particles, and a part of the catalyst particle(s) is subjected to the treating step (ii) in situ in the tube, the part of the catalyst particle(s) in the reactor tube that is subjected to the treating step (ii) may be subjected to the pore fill method of step (ii)a, the carbon dioxide addition of step (ii)b and the Leave step (ii)c. In one embodiment, the part that is not subjected to the treating step (ii) is not subjected to the pore fill method of step (ii)a, while it may be subjected to the carbon dioxide addition of step (ii)b.

In the processes of the present invention, treatment step (ii) or (c) preferably is performed while excluding oxygen from the (part of the) catalyst particle(s) that is/are being treated. The (part of the) catalyst particle(s) that is/are being treated is/are not contacted with any oxidant-containing gas during treatment step (ii) or (c).

The access of oxygen to the (part of the) catalyst particle(s) that is being treated may, for example, be excluded by feeding an inert gas, preferably nitrogen, to the reactor tube or container when excess liquid is removed from the catalyst particle(s).

An inert gas, preferably nitrogen, is preferably used to remove excess liquid from the catalyst particle(s).

The drying step (iii) or (d) may, for example, be performed using air or an inert gas, preferably inert gas. Drying may take place at room temperature or at an elevated temperature. Additionally or alternatively, the catalyst particle may be heated before, during, and/or after the drying. During step (iii) or (d), the catalyst preferably is subjected to air or inert gas having a temperature between 70 and 300° C., more preferably between 80 and 120° C., even more preferably between 85 and 95° C. Optionally the catalyst is calcined during or after the drying step (iii) or (d).

According to a further aspect of the present invention, Fischer-Tropsch synthesis product is removed from the particle(s) before applying one of the processes of the current invention.

Fischer-Tropsch synthesis product is preferably removed from the deactivated catalyst in situ in the reactor. This may be performed by washing the catalyst with a hydrocarbon that is lighter than the Fischer-Tropsch synthesis product. For example, Fischer-Tropsch wax may be removed by washing with gas oil; the gas oil may be petroleum gas oil, or preferably, a synthetic gas oil, for example a gas oil produced using Fischer-Tropsch synthesis. After this removal step, the reactor tube preferably comprises less than 30 grams hydrocarbons per 100 grams catalyst particles, more preferably less than 10 grams hydrocarbons per 100 grams catalyst particles, most preferably less than 5 grams hydrocarbons per 100 grams catalyst particles. In a next step oxidation step (i) or (a) is performed.

The present invention also provides a regenerated catalyst that can be obtained by the regeneration processes of the current invention. The present invention also provides a process comprising the use of a catalyst according to the invention in a Fischer-Tropsch synthesis process.

It has now been found with the processes according to the present invention the activity of a deactivated, or spent, catalyst can be increased significantly.

The oxidation step(s) may be performed by treating the catalyst with an oxygen-containing gas at the above-indicated temperatures. A reduction step may be performed by contacting the catalyst with hydrogen or a hydrogen-containing gas, typically at temperatures of about 200 to 350° C.

A Fischer-Tropsch catalyst or catalyst precursor comprises a catalytically active metal or precursor therefor, and optionally promoters, supported on a catalyst carrier. The catalyst carrier in this case preferably comprises a refractory metal oxide, more preferably alumina, silica, titania, or mixtures thereof, most preferably porous titania. Preferably more than 70 weight percent of the carrier material consists of refractory metal oxide, more preferably more than 80 weight percent, most preferably more than 90 weight percent, calculated on the total weight of the carrier material. As an example of a suitable carrier material can be mentioned the commercially available Titanium Dioxide P25 ex Evonik Industries.

The carrier may comprise titania and another refractory metal oxide or silicate or combinations thereof. Examples of suitable carrier materials that may be present in the catalyst in addition to titania include: silica, alumina, zirconia, ceria, gallia and mixtures thereof, especially silica and alumina.

The catalytically active metal in the catalyst is cobalt. Cobalt may be added to the carrier in the form of, for example, cobalt hydroxide, CoOOH, cobalt oxide, a co-precipitate of cobalt and manganese hydroxide, a cobalt nitrite, or a cobalt ammonium complex, for example cobalt ammonium carbonate. The catalyst may also include one or more further components, such as promoters and/or co-catalysts.

Suitable co-catalysts include one or more metals such as iron, nickel, or one or more noble metals from Group 8-10 of the Periodic Table of Elements. Preferred noble metals are platinum, palladium, rhodium, ruthenium, iridium and osmium. Such co-catalysts are usually present in small amounts.

References to "Groups" and the Periodic Table as used herein relate to the new IUPAC version of the Periodic Table of Elements such as that described in the 87th Edition of the Handbook of Chemistry and Physics (CRC Press).

Typically, the amount of catalytically active metal present in the catalyst may range from 1 to 100 parts by weight per 100 parts by weight of carrier material, preferably from 3 to 50 parts by weight per 100 parts by weight of carrier material.

The catalyst may further comprise one or more promoters. One or more metals or metal oxides may be present as promoters, more particularly one or more d-metals or d-metal oxides. Suitable metal oxide promoters may be selected from Groups 2-7 of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are most suitable promoters. Suitable metal promoters may be selected from Groups 7-10 of the Periodic Table of Elements.

Manganese, iron, rhenium and Group 8-10 noble metals are particularly suitable as promoters, and are preferably provided in the form of a salt or hydroxide.

The promoter, if present in the catalyst, is typically present in an amount of from 0.001 to 100 parts by weight per 100 parts by weight of carrier material, preferably 0.05 to 20, more preferably 0.1 to 15. It will however be appreciated that the optimum amount of promoter may vary for the respective elements which act as promoter.

One particularly preferred Fischer-Tropsch catalyst comprises a manganese or vanadium promoter.

When fresh prepared, the catalyst may have been shaped or formed by means of spray drying, pelletizing, (wheel) pressing, extrusion, or application on a metal support (like a metal wire). The catalytically active metal and/or any promoter may have been added to the carrier material before or after shaping.

For example, in case of fixed bed particles, a cobalt compound, preferably cobalt hydroxide, CoOOH, cobalt oxide, or a co-precipitate of cobalt and manganese hydroxide, may be mixed with a refractory metal oxide, followed by extrusion. Or, a refractory metal oxide may be extruded, and in a later step the extrudates may be impregnated with a cobalt compound, preferably with a cobalt salt that is soluble in water and/or ethanol.

When a carrier material is shaped, it may be advantageous to add a binder material, for example to increase the mechanical strength of the catalyst or catalyst precursor. Additionally or alternatively, a liquid may be added to the carrier material before or during its shaping. The liquid may be any of suitable liquids known in the art, for example: water; ammonia, alcohols, such as methanol, ethanol and propanol; ketones, such as acetone; aldehydes, such as propanol and aromatic solvents, such as toluene, and mixtures of the aforesaid liquids. A most convenient and preferred liquid is water. The liquid may include viscosity improvers such as a polyvinylalcohol.

In case of extrusion, one may want to improve the flow properties of the carrier material. In that case it is preferred to include one or more flow improving agents and/or extrusion aids prior to extrusion. Suitable additives include fatty amines, quaternary ammonium compounds, polyvinyl pyridine, sulphoxonium, sulphonium, phosphonium and iodonium compounds, alkylated aromatic compounds, acyclic mono-carboxylic acids, fatty acids, sulphonated aromatic compounds, alcohol sulphates, ether alcohol sulphates, sulphated fats and oils, phosphonic acid salts, polyoxyethylene alkylphenols, polyoxyethylene alcohols, polyoxyethylene alkylamines, polyoxyethylene alkylamides, polyacrylamides, polyols and acetylenic glycols. Preferred additives are sold under the trademarks Nalco and Superfloc.

To obtain strong extrudates, it is preferred to include, prior to extrusion, at least one compound which acts as a peptising agent for the refractory metal oxide. For example, a peptising agent for titania may be included prior to extrusion. Suitable peptising agents are well known in the art and include basic and acidic compounds. Examples of basic compounds are ammonia, ammonia-releasing compounds, ammonium compounds or organic amines. In case of a calcination step after shaping, such basic compounds are removed upon calcination and are not retained in the extrudates. This is advisable as such basic compounds may impair the catalytic performance of the final product. Preferred basic compounds are organic amines or ammonium compounds. A most suitable organic amine is ethanol amine. Suitable acidic peptising agents include weak acids, for example formic acid, acetic acid, citric acid, oxalic acid, and propionic acid.

Optionally, burn-out materials may be included prior to extrusion, in order to create macropores in the resulting extrudates. Suitable burn-out materials are commonly known in the art.

The total amount of flow-improving agents/extrusion aids, peptising agents, and burn-out materials in the carrier material to be extruded preferably is in the range of from 0.1 to 20% by weight, more preferably from 0.5 to 10% by weight, on the basis of the total weight of the mixture.

After shaping, the carrier material, optionally including further components, may be strengthened by calcination thereof in a manner known in the art. The calcination temperature depends on the carrier material used. Titania is preferably calcined at a temperature between 350 and 700° C., more preferably between 400 and 650° C., more preferably between 450 and 600° C. A calcination step is nevertheless optional, especially when preparing a Fischer-Tropsch catalyst comprising titania and cobalt.

Activation of a fresh prepared catalyst, whether it is a powder like slurry catalyst, fixed bed catalyst, or immobilised slurry catalyst, can be carried out in any known manner and under conventional conditions. For example, the catalyst may be activated by contacting it with hydrogen or a hydrogen-containing gas, typically at temperatures of about 200° to 350° C.

The catalyst that is subjected to the process of the current invention has been deactivated by use in a Fischer-Tropsch process.

The invention further provides a process for performing a Fischer Tropsch reaction comprising the following steps:
- regenerating one or more cobalt comprising Fischer-Tropsch catalyst particles in situ in a reactor tube according to the present invention, especially according to any one of claims 1 to 9;
- providing syngas to the reactor and providing the following process conditions in the reactor: a temperature in the range from 125 to 350° C., a pressure in the range from 5 to 150 bar absolute, and a gaseous hourly space velocity in the range from 500 to 10000 Nl/l/h;
- removing Fischer Tropsch product from the reactor.

The invention further relates to the regenerated catalyst and the use thereof in Fischer-Tropsch processes. The invention provides a process for performing a Fischer Tropsch reaction comprising the following steps:
- providing syngas to a reactor, said reactor comprising catalyst particles that have been regenerated using a process according to the present invention, especially according to any one of claims 1 to 9, and providing the following process conditions in the reactor: a temperature in the range from 125 to 350° C., a pressure in the range from 5 to 150 bar absolute, and a gaseous hourly space velocity in the range from 500 to 10000 Nl/l/h;
- removing Fischer Tropsch product from the reactor.

The Fischer-Tropsch process is well known to those skilled in the art and involves synthesis of hydrocarbons from syngas, by contacting the syngas at reaction conditions with the Fischer-Tropsch catalyst.

The synthesis gas can be provided by any suitable means, process or arrangement. This includes partial oxidation and/or reforming of a hydrocarbonaceous feedstock as is known in the art. To adjust the $H_2/CO$ ratio in the syngas, carbon dioxide and/or steam may be introduced into the partial oxidation process. The $H_2/CO$ ratio of the syngas is suitably between 1.5 and 2.3, preferably between 1.6 and 2.0.

The syngas comprising predominantly hydrogen, carbon monoxide and optionally nitrogen, carbon dioxide and/or steam is contacted with a suitable catalyst in the catalytic conversion stage, in which the hydrocarbons are formed. Suitably at least 70 v/v % of the syngas is contacted with the catalyst, preferably at least 80%, more preferably at least 90%, still more preferably all the syngas.

A steady state catalytic hydrocarbon synthesis process may be performed under conventional synthesis conditions known in the art. Typically, the catalytic conversion may be effected at a temperature in the range of from 100 to 600° C., preferably from 150 to 350° C., more preferably from 175 to 275° C., most preferably 200 to 260° C. Typical total pressures for the catalytic conversion process are in the range of from 5 to 150 bar absolute, more preferably from 5 to 80 bar absolute. In the catalytic conversion process mainly $C_5$+hydrocarbons are formed.

A suitable regime for carrying out the Fischer-Tropsch process with a catalyst comprising particles with a size of least 1 mm is a fixed bed regime, especially a trickle flow regime. A very suitable reactor is a multitubular fixed bed reactor.

EXPERIMENTAL

Measurement Method; Activity

Catalytic activities can be measured, for example, in a model Fischer-Tropsch reactor. The catalytic activities measured may be expressed as space time yield (STY) or as an activity factor, whereby an activity factor of 1 corresponds to a space time yield (STY) of 100 g/l·hr at 200° C.

Sample Preparation

Fixed bed particles were prepared as follows. A mixture was prepared containing titania powder, cobalt hydroxide, manganese hydroxide, water and several extrusion aids. The mixture was kneaded for and shaped using extrusion. The extrudates were dried and calcined. The obtained catalyst (precursor) contained about 20 wt % cobalt and about 1 wt % of manganese.

This catalyst was used in a Fischer-Tropsch process for several years. Thereafter, Fischer-Tropsch product was removed from the deactivated, or spent, catalyst using gas oil that was prepared in a Fischer-Tropsch process. In a next step the deactivated catalyst was treated with a hydrogen comprising gas for several hours at an elevated temperature. The deactivated catalyst was oxidised at a temperature of 270° C. The reactor was unloaded and samples of the deactivated catalyst particles were obtained.

During unloading, portions from different locations in the reactor were collected. For the comparative example and the example according to the invention, samples were taken from the bottom end of reactor tubes.

Comparative Example

A solution was prepared by mixing concentrated ammonia, ammonium carbonate and water. The weight ratios were about 1:1:1.

Samples of deactivated fixed bed particles, prepared as indicated above, were treated with this solution using a pore fill method.

The fixed bed particles were put in a reactor tube. Pores of the fixed bed particles were filled with the solution by filling the reactor tube with the liquid, and after 1 hour contact time at 26.7° C., draining of the excess liquid.

The remaining liquid was left in the pores for more than 5 minutes at a temperature between 50 and 60° C. Then the particles were dried.

Example According to Invention

Samples of deactivated fixed bed particles, prepared as indicated above, were treated according to the invention.

The fixed bed particles were put in a reactor tube. Pores of the fixed bed particles were filled with concentrated solution of ammonia in water by filling the reactor tube with the solution, and after 1 hour contact time at 35° C., draining of the excess liquid. The remaining liquid was left in the pores.

Carbon dioxide was passed through the reactor tube along the catalyst particles. Ammonia and carbon dioxide converted into ammonium carbonate and/or ammonium bicarbonate.

The carbon dioxide treated liquid, which comprised ammonium carbonate and/or ammonium bicarbonate, was left in the pores for more than 5 minutes at a temperature between 50 and 60° C. Then the particles were dried.

Activity Measurements

Samples from the comparative example and samples from the example according to the invention were reduced with a hydrogen comprising gas, and then the activity of the samples was determined.

The activity and selectivity measurements were performed using a Fischer-Tropsch reaction at a temperature of 210° C. and a total pressure of 60 bar abs. Table 1 shows the measurement results.

TABLE 1

| | Liquid used during pore fill method | Temp. during contact time in pore fill method | Cobalt leaching upon draining in pore fill method | Selectivity of regenerated samples; wt % of hydrocarbons |
|---|---|---|---|---|
| Comparative example | Ammonia/ ammonium carbonate/water | 26.7° C. | 0.95 wt % | 91 |
| Example according to invention | Conc. ammonia in water | 35° C. | 0.01 wt % | 92 |

At the start of the activity measurements, the activity of all regenerated samples was higher as compared to the activity of freshly prepared catalysts. After 800 hours of operation, the activity of the samples of the comparative examples was slightly lower than the activity of the samples according to the invention.

From these experiments is clear that the regeneration method used in the comparative example and the regeneration method used in the example according to the invention both result in well regenerated Fischer Tropsch catalysts.

One advantage of a process according to the present invention is that no or almost no cobalt is lost during the treatment step.

What is claimed is:

1. A process for regenerating one or more Fischer-Tropsch catalyst particles comprising cobalt in situ in a reactor tube, said catalyst particle(s) having been deactivated by use in a Fischer-Tropsch process, said process for regenerating comprising the steps of:
    (i) oxidising the catalyst particle(s) at a temperature between 20 and 400° C.;
    (ii) treating the catalyst particle(s) for more than 5 minutes;
    (iii) drying and optionally heating the catalyst particle(s); and
    (iv) reducing the catalyst particle(s) with hydrogen or a hydrogen comprising gas;
wherein the treatment step (ii) comprises the steps of:
    (ii)a filling pores of the catalyst particle(s) with a liquid comprising ammonia and having a pH in the range of from 10 to 14, at a temperature in the range of from 0 to 50° C., using a pore fill method in which most of the pores of the carrier material at the surface of one or more catalyst particles are filled with the liquid,
    (ii)b passing carbon dioxide through the reactor tube along the catalyst particle(s); and
    (ii)c leaving the carbon dioxide treated liquid in the pores for more than 5 minutes at a temperature between 5 and 90° C.

2. A process according to claim 1, characterized in that the catalyst particle(s) is/are reduced with hydrogen or a hydrogen comprising gas after the oxidation step and before the treatment step (ii).

3. A process according to claim 1, wherein the liquid comprising ammonia has a pH in the range of from 11 to 14.

4. A process according to claim 1, wherein in addition to carbon dioxide, one or more amines, is/are supplied to the catalyst particle(s) in step (ii)b.

5. A process according to claim 1, wherein in addition to carbon dioxide extra ammonia is supplied to the catalyst particle(s) in step (ii)b.

6. A process according to claim 1, wherein the catalyst particle(s) is/are fixed bed particle(s) larger than 1 mm or immobilised slurry particle(s) larger than 1 mm.

7. A process according to claim 1, wherein 85% or less of the catalyst particle(s) are treated whereby the part of the catalyst particle(s) located at the upstream end is not or is hardly subjected to step (ii).

8. A process according to claim 7, characterized in that at least 20% are treated, whereby the part of the catalyst particle (s) located at the downstream end is subjected to step (ii).

9. A process for performing a Fischer Tropsch reaction comprising the following steps:
    regenerating one or more Fischer-Tropsch catalyst particles comprising cobalt in situ in a reactor tube according to claim 1;
    providing syngas to the reactor and providing the following process conditions in the reactor: a temperature in the range from 125 to 350° C., a pressure in the range from 5 to 150 bar absolute, and a gaseous hourly space velocity in the range from 500 to 10000 Nl/l/h;
    removing Fischer Tropsch product from the reactor.

10. A process for regenerating one or more Fischer-Tropsch catalyst particles comprising cobalt, said catalyst particle(s) having been deactivated by use in a Fischer-Tropsch process in a reactor tube, said process for regenerating comprising the steps of:
    (a) oxidising the catalyst particle(s) in the reactor tube at a temperature between 20 and 400° C.;
    (b) unloading the catalyst particle(s) from the reactor tube;
    (c) treating catalyst particle(s) for more than 5 minutes;
    (d) drying and heating the catalyst particle(s);
    wherein the treatment step (c) comprises the steps of:
    (c)I filling pores of the catalyst particle(s) with a liquid comprising ammonia and having a pH in the range of from 10 to 14, at a temperature in the range of from 0 to 50° C., using a pore fill method in which most of the pores of the carrier material at the surface of one or more catalyst particles are filled with the liquid,
    (c)II passing carbon dioxide along the catalyst particle(s); and
    (c)III leaving the carbon dioxide treated liquid in the pores for more than 5 minutes at a temperature between 5 and 90° C.

11. A process according to claim 10, characterized in that the catalyst particle(s) is/are reduced with hydrogen or a hydrogen comprising gas after the oxidation step and before the treatment step (c).

12. A process according to claim 10, wherein the liquid comprising ammonia has a pH in the range of from 11 to 14.

13. A process according to claim 10, wherein in addition to carbon dioxide, one or more amines, is/are supplied to the catalyst particle(s) in step (c)II.

14. A process according to claim 10, wherein in addition to carbon dioxide extra ammonia is supplied to the catalyst particle(s) in step (c)II.

15. A process according to claim 10, wherein the catalyst particle(s) is/are fixed bed particle(s) larger than 1 mm or immobilised slurry particle(s) larger than 1 mm.

16. A process according to claim 10, wherein 85% or less of the catalyst particle(s) are treated whereby the part of the catalyst particle(s) located at the upstream end is not or is hardly subjected to step (c).

17. A process according to claim 16, characterized in that at least 20% are treated, whereby the part of the catalyst particle (s) located at the downstream end is subjected to step (c).

* * * * *